July 7, 1931.　　　J. F. HABERLIN　　　1,813,352
COVER FOR SCREW SHAFTS
Filed July 7, 1930
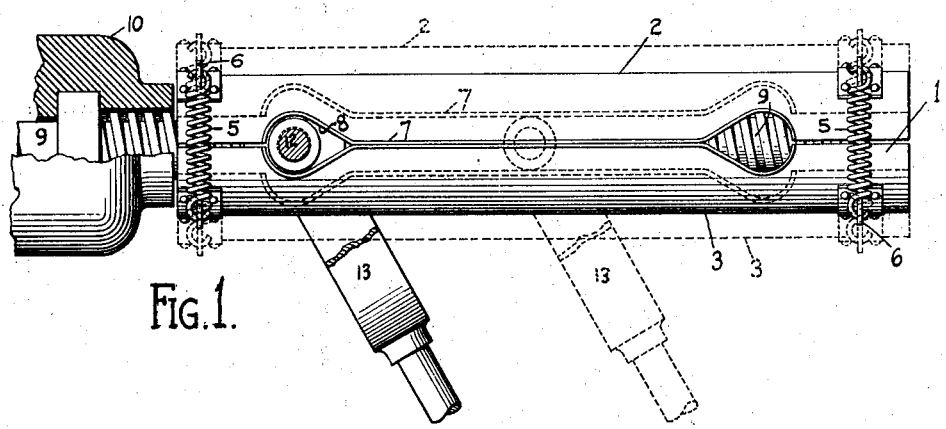
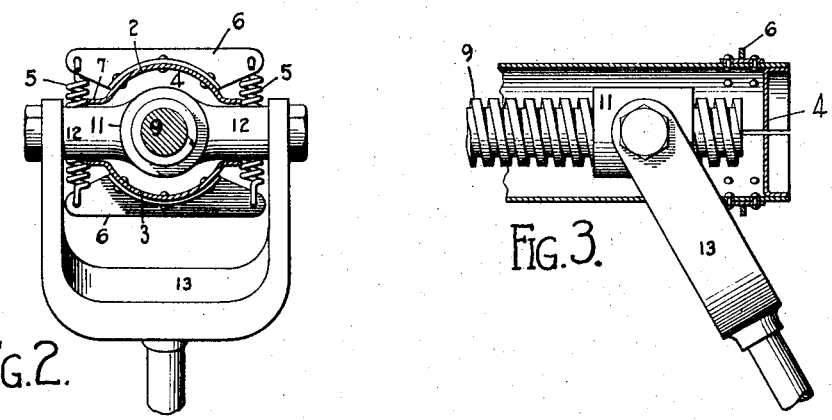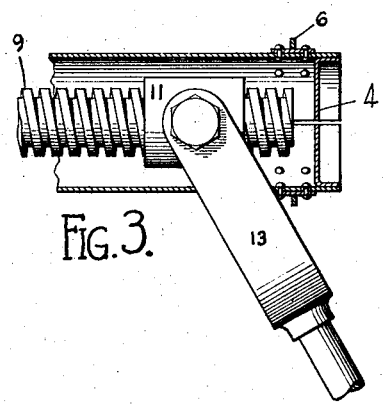
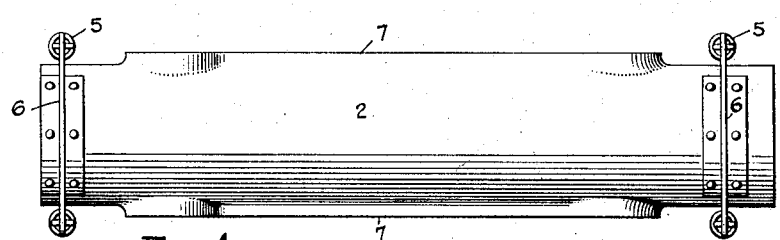
INVENTOR
JOHN F. HABERLIN
BY
ATTORNEY Patented July 7, 1931

1,813,352

UNITED STATES PATENT OFFICE

JOHN F. HABERLIN, OF SEATTLE, WASHINGTON, ASSIGNOR TO BOEING AIRPLANE COMPANY, OF SEATTLE, WASHINGTON

COVER FOR SCREW SHAFTS

Application filed July 7, 1930. Serial No. 466,157.

This invention relates to improvements in aircraft and more especially to a means for protecting screw shafts and the like in connection with retractable landing gear apparatus or other parts which are exposed to the elements and subject to clogging with mud, snow or ice, and injury from rocks or the like.

The principal object of my invention is the provision of a cover for such a purpose arranged to yieldingly embrace a screw shaft, so employed, and to permit free longitudinal passage of collars, nuts, yokes and the like, along said screw shaft.

These and other objects will appear as my invention is more fully hereinafter described in the following specification, illustrated in the accompanying drawings, and finally pointed out in the appended claims.

Figure 1 is a side elevation of my improved form of screw shaft cover.

Figure 2 is an end view of Figure 1.

Figure 3 is a fragmentary sectional side elevation of the device.

Figure 4 is a plan view of the cover proper.

Referring now more particularly to the drawings:

The main body 1 of my cover consists of a cylinder or sleeve which is longitudinally split to form two halves indicated at 2 and 3. Split end walls 4 are secured to the ends of the sleeve as shown in Figure 3, and the whole forms substantially a complete closure for a screw 9, and is spaced thereabout.

Both halves of the sleeve are yieldingly held together by means of springs 5 which are secured at their opposite ends to the two halves, or to members secured thereon as the arms 6 transversely arranged and securely mounted on each half of the sleeve. The abutting edges of each half of the sleeve are flanged outwardly, as indicated at 7, and recessed at longitudinally spaced points, indicated at 8.

In nearly all types of retractable apparatus used in aircraft, such as retractable landing gear, and the like, such screw shafts as are indicated at 9 are employed. These shafts usually are arranged with one of their ends rotatably mounted in a bearing 10, and their opposite ends free. The bearing 10 may be suitably mounted to accommodate such movement as may be necessary.

Upon the shaft is mounted an internally threaded collar or nut 11 formed with outwardly extending arms 12 to which is secured a yoke 13. The yoke extends downwardly and connects with a movable portion of the retractable landing gear. As the shaft is rotated the collar 11 is advanced or retarded with a resultant upward or downward swing of the shaft and a raising or lowering of the landing gear.

As the nut moves along the shaft its arms 12 force the two halves 2 and 3 of the sleeve apart as shown in dotted lines in Figure 1. When the nut reaches its limit of travel in either direction, the arms register with the recesses 8, which permit the two halves to return for abutment with each other in a closed position. Thus the shaft is entirely enclosed and protected as aforesaid, with the exception of the recesses 8 at the end opposite the nut.

While I have shown a particular embodiment of my invention, I am aware that changes therein will readily suggest themselves to others skilled in the art, and may be accomplished without departing from the spirit and scope of the invention. Having thus described the invention, what I claim as new and desire to protect by Letters Patent is:—

1. A device of the class described consisting of an expansible sleeve adapted to embrace a screw-shaft and to permit passage of a traveler along said shaft, said sleeve being longitudinally divided into two halves, each of said halves being yieldingly held together and having their abutting edges flanged and recessed, the recessed portions being adapted to receive extensions formed on said traveler at their end of travel in either direction along said shaft, both of said halves being spread apart as the said extensions pass between their flanged edges.

2. In a device of the character described, the combination of a traveler movable from one definite stop position to another, a diametrically expansible and contractible sleeve longitudinally divided into a plurality of parts, means yieldingly holding the parts contracted, and lateral extensions on the traveler projecting between the sleeve parts, the extensions and sleeve parts being relatively formed and adapted, at the stop positions, to permit contraction of the sleeve, and between the stop positions to cause expansion thereof by separation of the parts.

3. In a device of the character described, the combination of a traveler movable from one definite stop position to another, a diametrically expansible and contractible sleeve longitudinally divided into a plurality of parts, means yieldingly holding the parts contracted, and lateral extensions on the traveler projecting between the sleeve parts, the sleeve parts being recessed at the stop positions to accommodate the extensions with the sleeve fully contracted, and the extensions being of such length as to project between and separate the sleeve parts when in an intermediate position.

4. The combination of claim 3, the ends of the recesses in a direction towards which the traveler will move being complementally inclined to assist initial separation of the sleeve parts.

In testimony whereof I affix my signature.

JOHN F. HABERLIN.